United States Patent
Pulé et al.

(10) Patent No.: US 9,200,723 B2
(45) Date of Patent: Dec. 1, 2015

(54) SYSTEM FOR OPENING AND/OR CLOSING AN INLET VALVE AND/OR AN OUTLET VALVE OF A LIQUID CONTAINER

(75) Inventors: Joseph Pulé, Vittoriosa (MT); Joseph Cilia, Zebbug (MT); George Schembri, Birbirkara (MT); Werner Schmidt, Schondorf (DE)

(73) Assignee: ABERTAX RESEARCH & DEVELOPMENT LTD., Paola (MT)

( * ) Notice: Subject to any disclaimer, the term of this patent is extended or adjusted under 35 U.S.C. 154(b) by 1857 days.

(21) Appl. No.: 11/997,748

(22) PCT Filed: Aug. 7, 2006

(86) PCT No.: PCT/EP2006/065119
§ 371 (c)(1),
(2), (4) Date: Jun. 10, 2008

(87) PCT Pub. No.: WO2007/017496
PCT Pub. Date: Feb. 15, 2007

(65) Prior Publication Data
US 2009/0007324 A1    Jan. 8, 2009

(30) Foreign Application Priority Data

Aug. 6, 2005 (DE) .......................... 10 2005 037 122
Dec. 14, 2005 (DE) .......................... 10 2005 059 699

(51) Int. Cl.
*E03D 1/35* (2006.01)
*E03D 1/34* (2006.01)
(Continued)

(52) U.S. Cl.
CPC . *F16K 31/56* (2013.01); *E03D 1/32* (2013.01); *E03D 1/34* (2013.01); *E03D 1/36* (2013.01); *F16K 31/24* (2013.01); *F16K 31/3855* (2013.01); *F16K 31/404* (2013.01)

(58) Field of Classification Search
CPC ............... E03D 1/32; E03D 1/34; E03D 1/36; F16K 31/56; F16K 31/3855; F16K 31/404; F16K 31/24
USPC ............. 4/316, 321, 323, 324, 331, 332, 353, 4/355, 356, 359, 381, 394, 395; 137/412, 137/414, 422, 429
See application file for complete search history.

(56) References Cited

U.S. PATENT DOCUMENTS 2,301,972 A * 11/1942 Richter .......................... 137/398
4,333,185 A *  6/1982 Heinze et al. ..................... 4/319

(Continued)

FOREIGN PATENT DOCUMENTS

DE  1175793  8/1964
DE  2706054  8/1978

(Continued)

*Primary Examiner* — Len Tran
*Assistant Examiner* — Steven M Cernoch
(74) *Attorney, Agent, or Firm* — Themis Law

(57) ABSTRACT

The system for opening and/or closing an inlet valve (10) and/or an outlet valve (30) of a liquid container (24), particularly for water toilets, water tanks or the like, comprises an inlet tube (16) with an inlet valve (10) in the upper portion of the container (24) and an outlet tube (20) with an outlet valve (30) in the bottom portion (25) of the container (24), both valves (10, 30) being provided with a valve body. It is characterized by the use of a bistabile inlet valve (10) having a lag-free opening and closing characteristic without any intermediate opening position of the valve body (14; 38, 46), the closing stroke of the valve body being assisted by the flow of the liquid.

1 Claim, 9 Drawing Sheets

Figure 1:
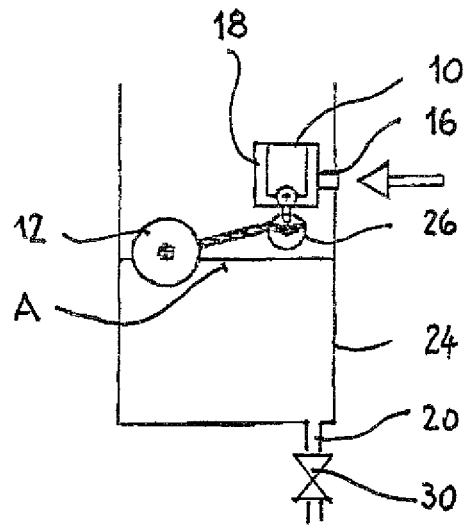

(51) Int. Cl.
*E03D 3/10* (2006.01)
*E03D 1/24* (2006.01)
*F16K 31/56* (2006.01)
*E03D 1/32* (2006.01)
*E03D 1/36* (2006.01)
*F16K 31/24* (2006.01)
*F16K 31/385* (2006.01)
*F16K 31/40* (2006.01)

(56) References Cited

U.S. PATENT DOCUMENTS 4,557,000 A * 12/1985 Strangfeld ................ 4/324
4,561,131 A * 12/1985 David ................ 4/326
5,072,751 A * 12/1991 Lin ................ 137/429
5,230,361 A * 7/1993 Carr et al. ................ 137/416
6,240,954 B1 * 6/2001 Bereznai ................ 137/312
6,276,659 B1 8/2001 Wang
7,175,154 B2 * 2/2007 Bereznai ................ 251/22

FOREIGN PATENT DOCUMENTS

| GB | 2285674 | 7/1995 | |
|---|---|---|---|
| WO | WO 92/21906 | * 10/1992 | ............ F16K 31/385 |
| WO | 92/21906 | 12/1992 | |
| WO | 99/40264 | 8/1999 | |

* cited by examiner

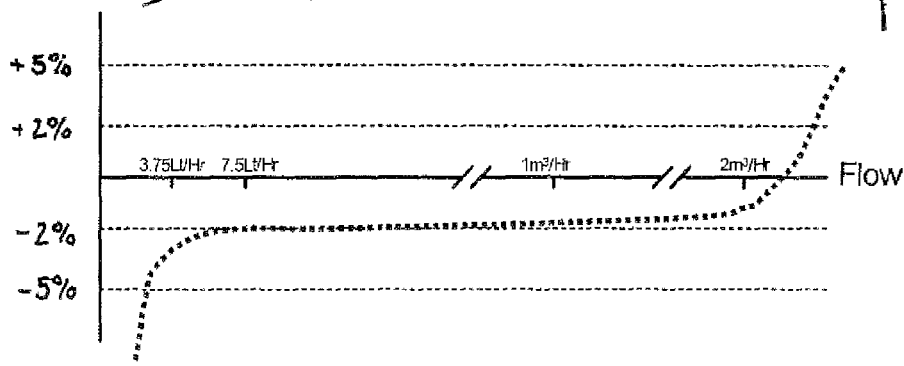
Fig. 9
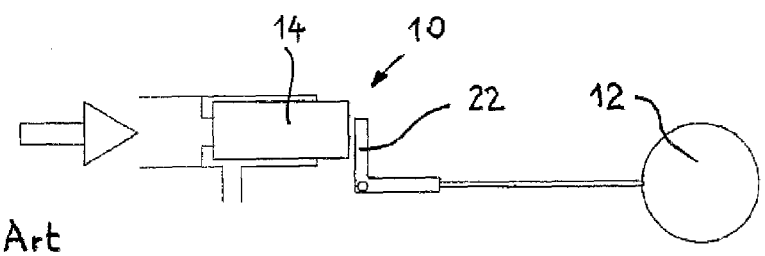
Fig. 10
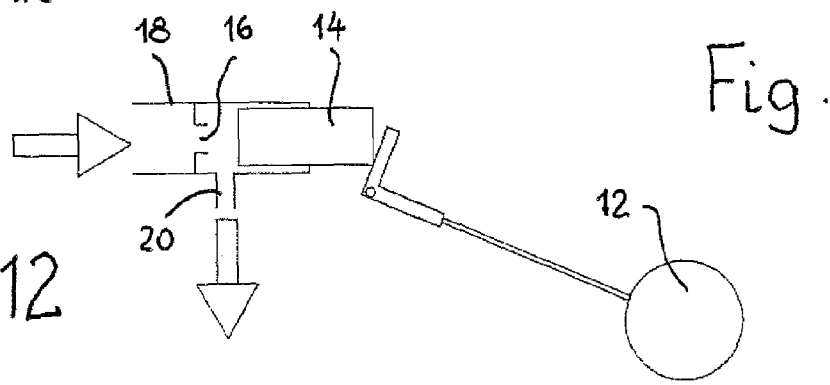
Fig. 11
Prior Art
Fig. 12

SYSTEM FOR OPENING AND/OR CLOSING AN INLET VALVE AND/OR AN OUTLET VALVE OF A LIQUID CONTAINER

The present invention relates to a system for opening and/or closing an inlet valve and/or an outlet valve of a liquid container, particularly for water toilets, water tanks or the like, comprising an inlet tube with an inlet valve in the upper portion of the container and an outlet tube with an outlet valve in the bottom portion of the container, both valves being provided with a valve body.

Typically, the households of a country are supplied with water by public water distributing organisations billing the customers for the metered quantity of the water transferred to the customer. To measure the water flow, water meters as e.g. volumetric meters are installed in the water supply conduit. However, those meters have a limited measuring accuracy, even if highly sophisticated meters are used. Such low meter reading errors are particularly critical in the starting flow phase in which very small flow quantities cannot be detected. Consequently, the apparent water loss which consists of water that it produced, distributed and ultimately consumed, will not be paid for by the consumer.

FIGS. 11 and 12 illustrate an example of a traditional inlet valve 10 used to close the water inlet into a container, for example of a water toilet or a potable water tank, which in southern countries are often installed on the roof of a building. If water is consumed from the container, a ball float 12 will move, together with the sinking water level, to the position shown in FIG. 12 such that the incoming water pressure shown by the arrow will shift the cylindrical valve body 14 to open the inlet orifice 16 of the valve housing 18. In that position, the incoming water may flow through the orifice 16 and the outlet tube 20 into the container.

The increasing water level in the container will move the float 12 into its closing position shown in FIG. 11 such that its control rod 22 urges against the valve body 14 in order to close the inlet orifice 16. However, in this closing phase the control rod 22 and the valve body 14 have to move against the inlet water pressure which can be up to 7 bars. This more than 100 years old technology has the disadvantage that small water portions flowing into the tank trigger a minimal opening of the valve with a minimum flow of water into the tank. Even new water meters are unable to register such minimal water flow typically used for toilet flushing, washing hands, beverage preparation etc. Test in Malta have shown that such apparent losses of about 2.5 $m^3$ in each household result in a financial loss of about 11 Euros which means that the annual financial loss for 140,000 domestic consumers in Malta is of about 1,500,000 Euros.

FIG. 9 illustrates the measuring accuracy of a traditional volumetric meter as a function of the water flow. The diagram shows that the first point is the starting flow of about 3.75 liter/hr at which point the meter will start to perform with a fairly acceptable level of accuracy, usually at 5% under recording. Only the second point is the minimum accurate flow twice the starting flow, i.e. 7.5 liter/hr, at which point the meter will reach its maximum accuracy, usually at 2%. Above the maximum flow of about 2 $m^3$/hr the meter will perform erratically and damage to the meter mechanism is possible.

FIG. 10 is an example of a flow diagram of a roof tank which is provided with a ball valve 10 as shown in FIGS. 11 and 12. From that diagram it is clear that the slow closure of the roof tank valve induces flows that are lower than the starting flow of the water meter. The larger the surface area of the roof tank or the higher the starting flow of the meter, the larger will be the resulting meter under-registration.

It is an object of the invention to provide a system, in which the problem of apparent water losses is resolved such that trickle water flows which cannot be measured are avoided.

According to the invention, this problem is resolved by the use of a bistable inlet valve having a lag-free opening and closing characteristic without any intermediate opening position of the valve body, the closing stroke of the valve body being assisted by the flow of the liquid.

As according to the invention the closing stroke of the valve body will not work against the incoming flow of the liquid but will be assisted by that flow, the inlet valve has only two stable positions, i.e. an all open and an all closed position.

A first possibility for the construction for such a bistable inlet valve is described in one embodiment of the invention. As the toggle joint connecting the float with the valve body will switch instantaneously from its first position to its second position, also the valve body will move instantaneously from its open position into its closed position.

A second possibility for the structure of the inlet valve is described in another embodiment of the invention. As in this embodiment a permanent magnet is used to move the armature, no electric supply is required to energize the valve which may be installed inside the water tank. A further advantage of this system is that it does not consume any energy.

Figure 8:
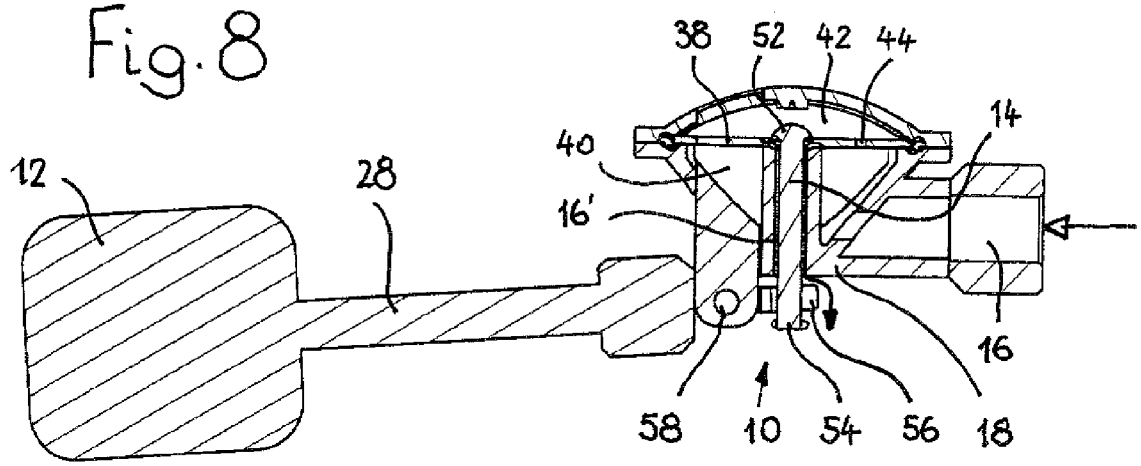

A third embodiment of the invention is shown in FIG. 8. Also in this case, the closure movement of the float and of the valve body is assisted by the flow of incoming water. In all cases, this basic principle has the advantage that the whole inlet valve may have a miniature size which is ten times smaller than a traditional ball valve shown in FIGS. 11 and 12. Accordingly, the valve may be installed in a container or tank which needs an extremely small horizontal place and which may have a long vertical extension, such that it may have the form of a tube.

A further object of the invention is to provide a flushing system, which may be of a simple and reliable structure that requires only few elements. Indeed, traditional flushing systems have a sophisticated and complex mechanism needing up to 50 single parts. Such a mechanism is difficult to be assembled and susceptible to failure; this problem is aggravated if maintenance and repair works have to be made on the system having its container incorporated in a wall.

There are known also electronically controlled flushing systems which also need sophisticated components as for example optical sensors or ultrasonic detectors. This means that such systems are very expensive. As a further disadvantage, they often do not provide the possibility of a mechanical actuation, which is a particular drawback in case of interruption or breakdown of electric power supply or of the electronic control system.

In still another embodiment if the invention, the mentioned problem is resolved by the fact that the valve body of the outlet valve has, at least in its lower part, a spherical or conical form adapted to hermetically close a circular seat in the entrance port of the outlet tube, said valve body being connected to release means for opening the entrance port.

Preferably, the release means comprise a traction element, e.g. a flexible cord, connected to an actuating mechanism provided above the upper end of the container. In this solution, the valve body may be drawn into its opening position either manually by the traction element or by an electric command such that it opens the entrance port in the bottom of the container.

According to a further embodiment of the invention, the valve body is connected, through the traction element, with a float positioned above the valve body. Said float can be used for automatic repetitive mechanical flushing or to help an electromagnetic lifter positioned under the actuating mechanism. Said float will lift the valve body by means of its buoyancy if the liquid level is rising such that the entrance port of the outlet tube will be opened for an automatic flushing which is particularly advantageous in public toilets. At the end of the flushing phase, the reduced liquid level will lower the float and the valve body returns into its closed position.

As already mentioned, the traction element may be connected with an electromagnetic lifter positioned under the actuating system mechanism. Said lifter may comprise a solenoid coil provided with an armature vertically sliding within said coil and connected to the traction element.

In order to actuate the electromagnetic lifter, the solenoid coil is connected through a line to a control circuit which is connected with at least one release element which may comprise a manually or foot actuated sensor pad.

In this embodiment, the electromagnetic lifter may raise through the traction element the valve body into its opening position. In case of a breakdown of the electric power supply system, the valve body may be manually raised into its opening position by means of the traction element.

According to a further embodiment of the invention, the valve body is vertically movable in a guide body which is fastened in said container and which is provided on its lower end with discharge openings for the liquid. Said guide body may be fastened within a cupular tube having its open end positioned near the bottom of the container, the upper end of said guide body being fastened to a cover of the cupular tube and being provided with overflow bores. Such an embodiment has the advantage that the flushing liquid running through the outlet tube will create a Venturi effect such that the traction element and the electromagnetic lifter will be relieved.

According to a further embodiment of the invention, in the above mentioned guide body an upper air chamber is provided between said valve body in the form of a cylindrical float piston and an upper lid closing said guide body. An aperture provided in said lid is connected through an air duct to a release means in the form of an exhaust valve. Discharge openings in the guide body lead into a ring-shaped lower pressure chamber, the pressure exerting an upward force to said float piston.

Figure 2:
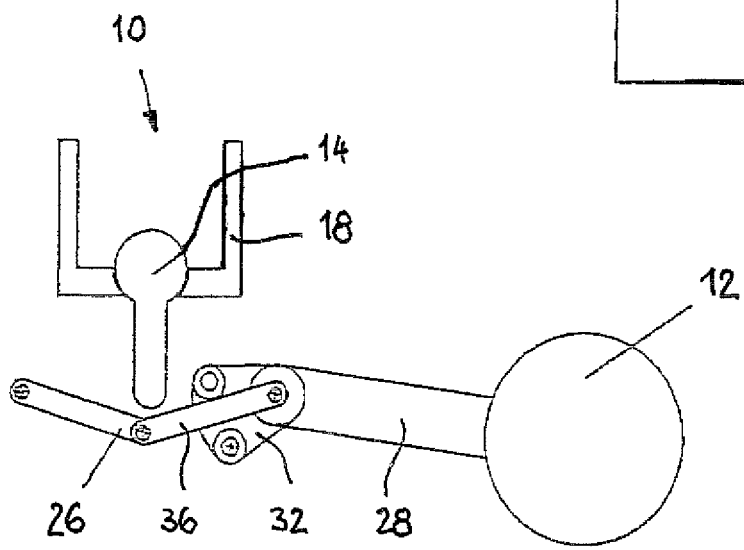
Figure 3:
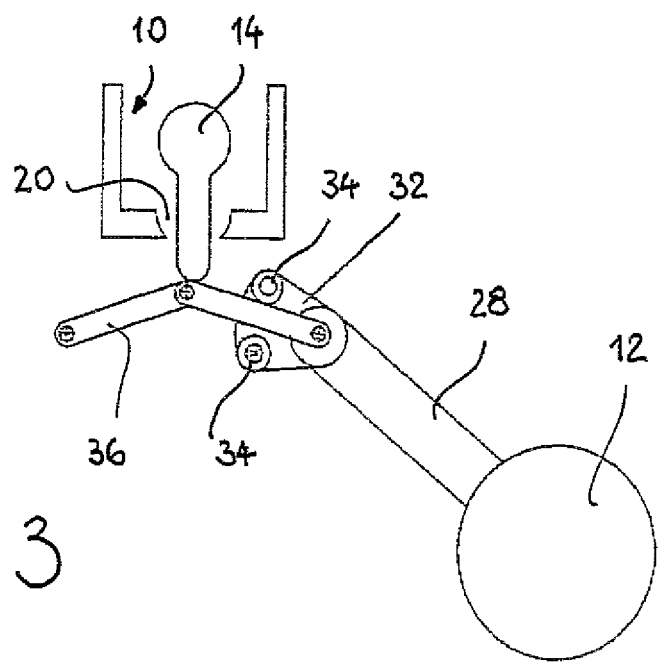
Figure 4:
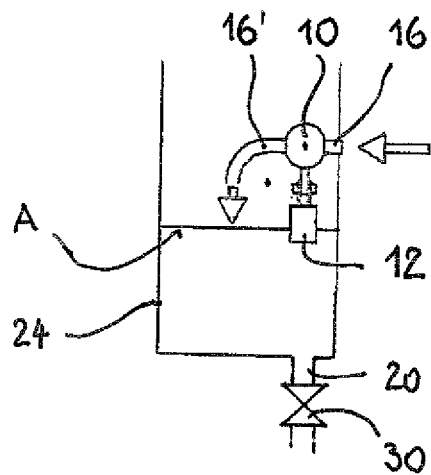
Figure 5:
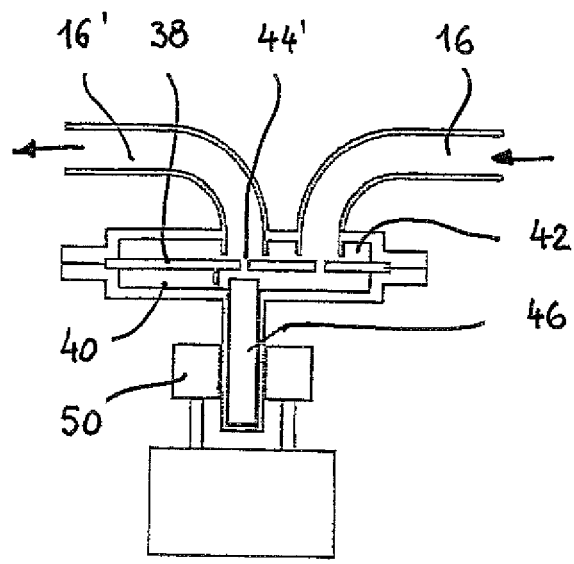
Figure 6:
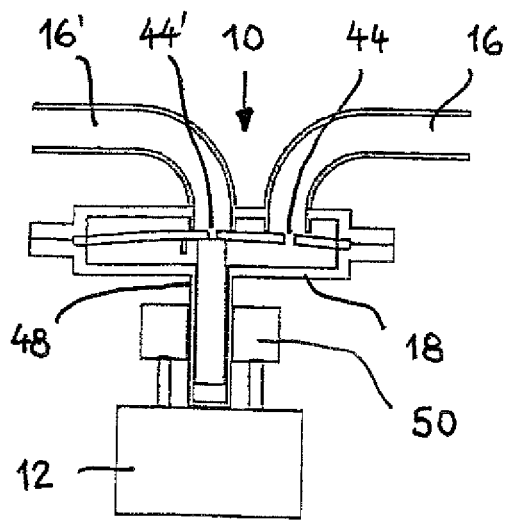
Figure 7:
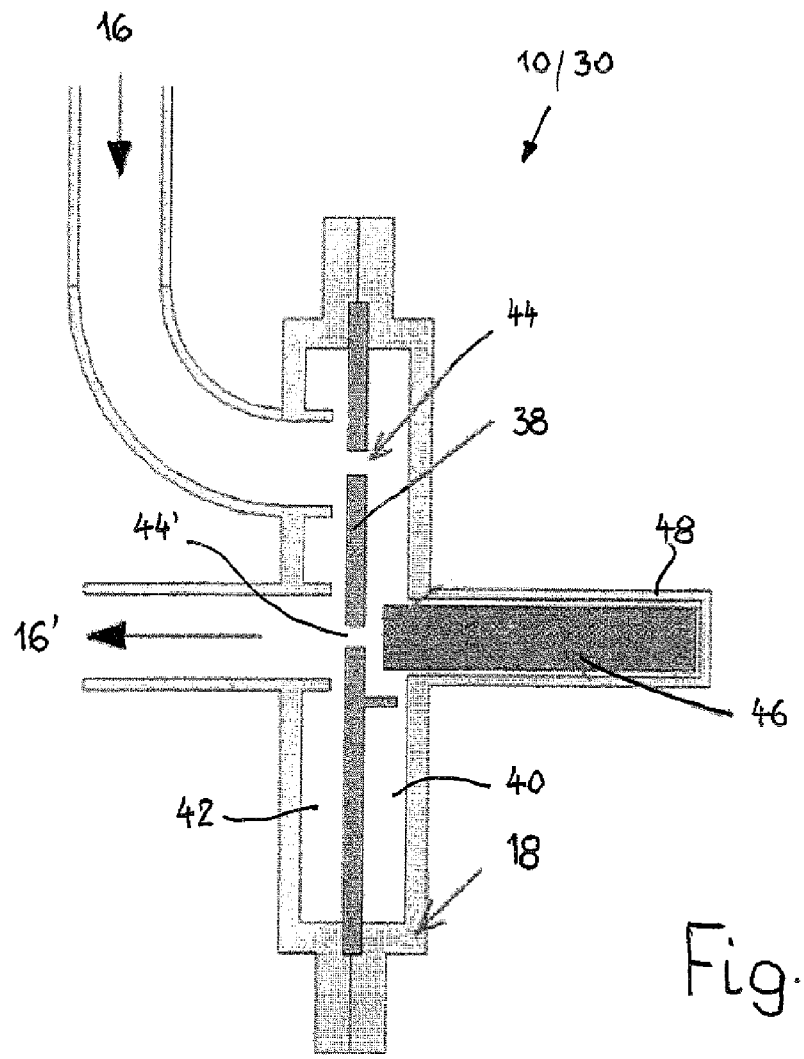
Figure 13:
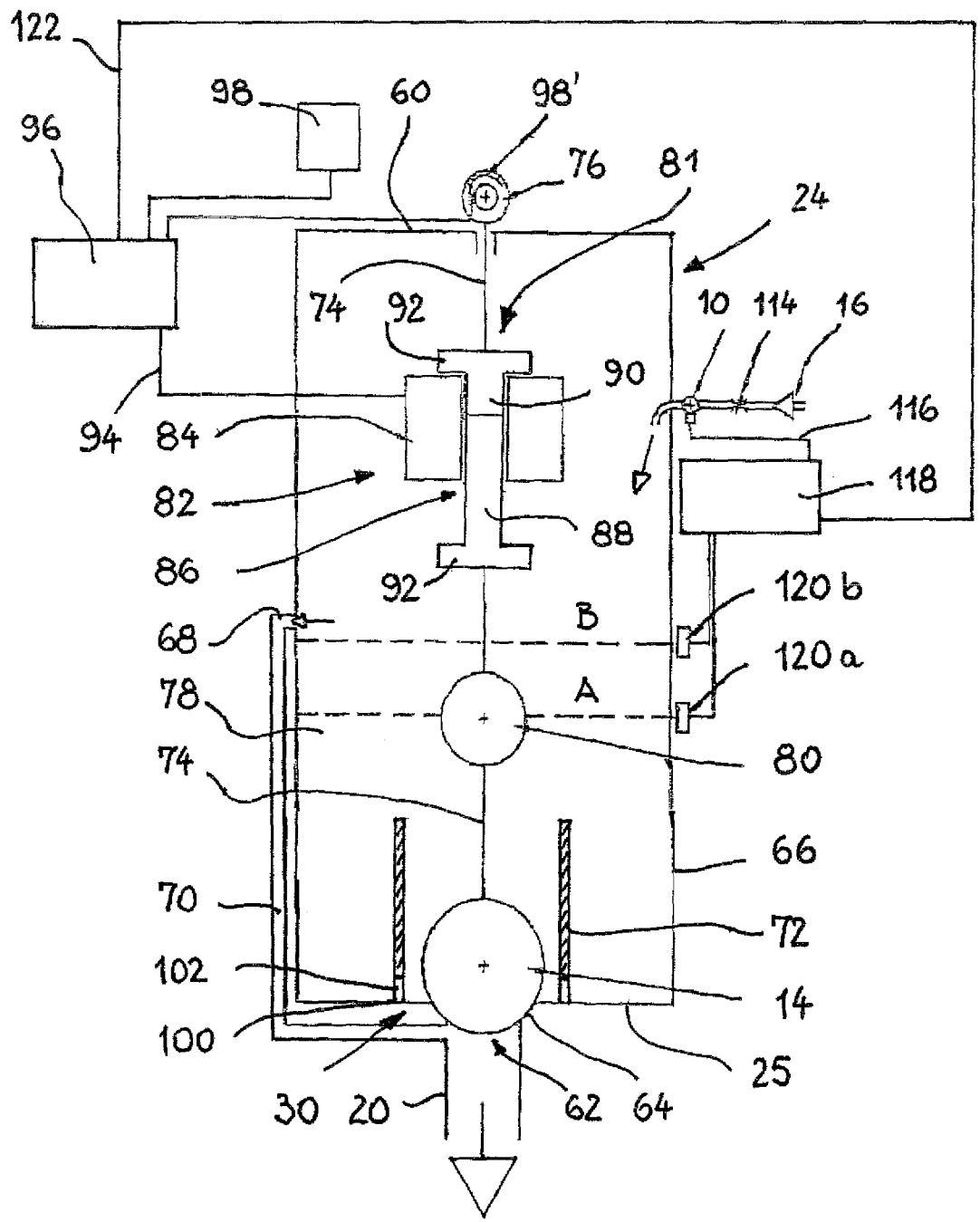
Figure 14:
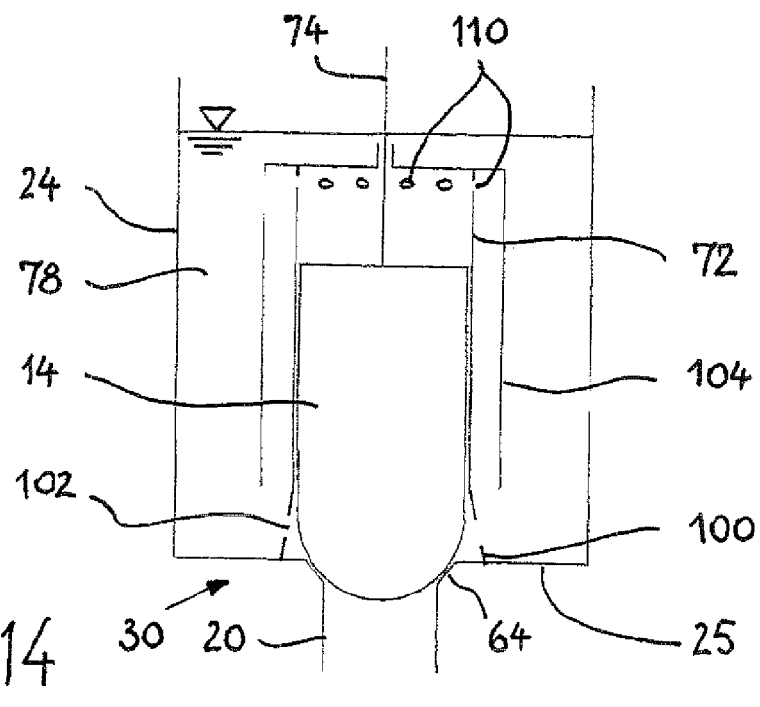
Figure 15:
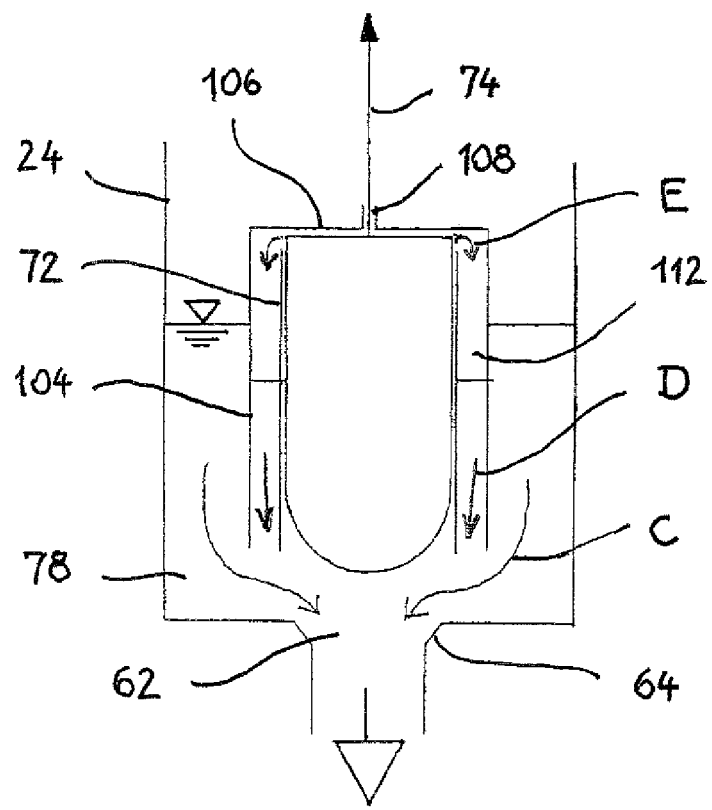
Figure 16:
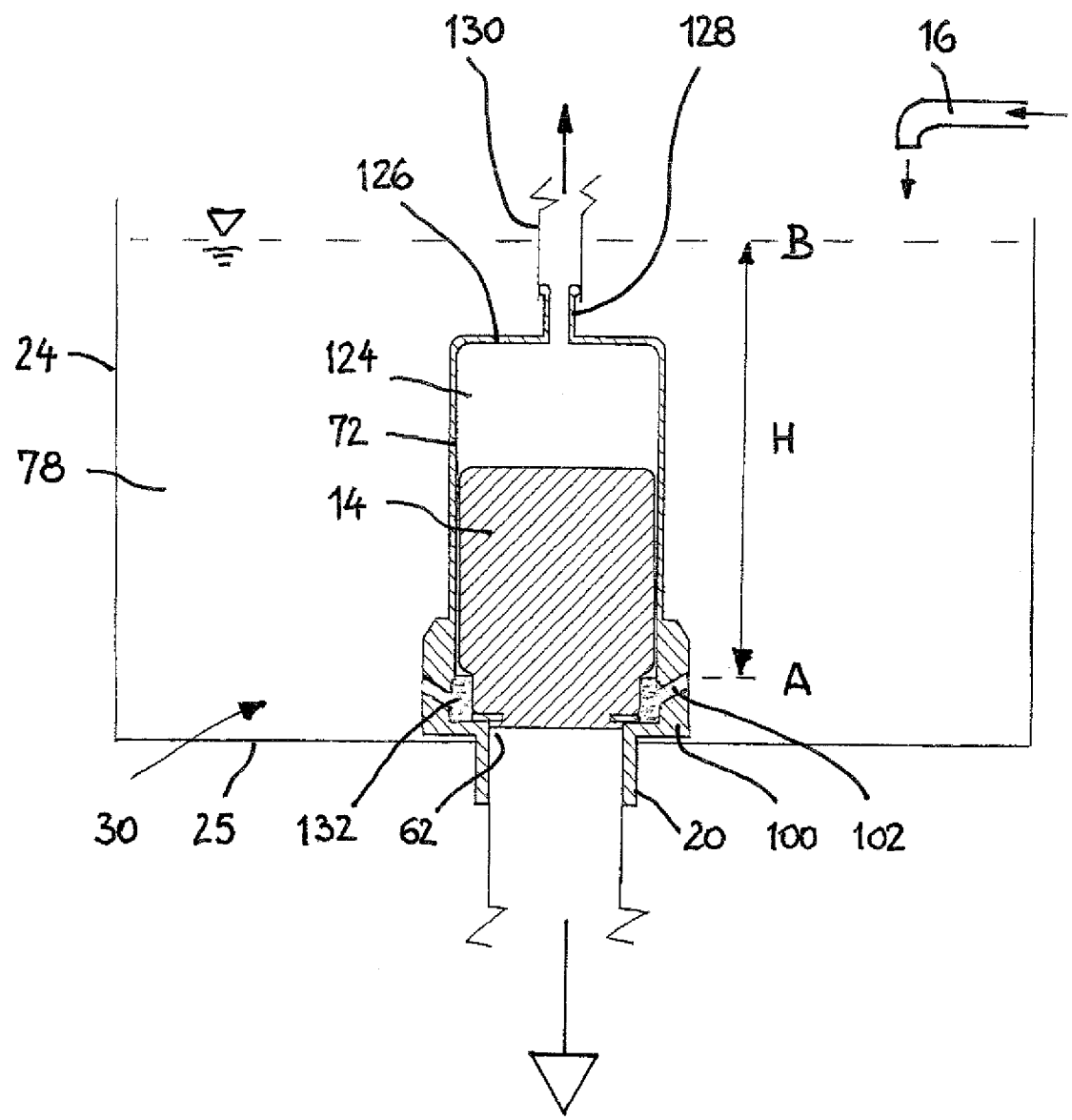
Figure 17:
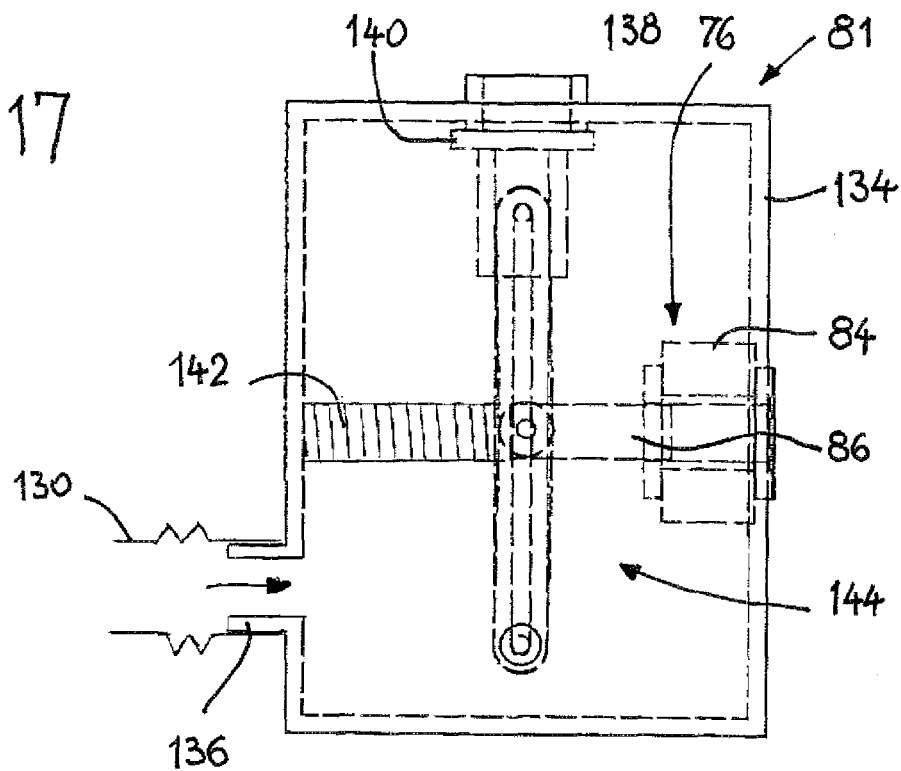
Figure 18:
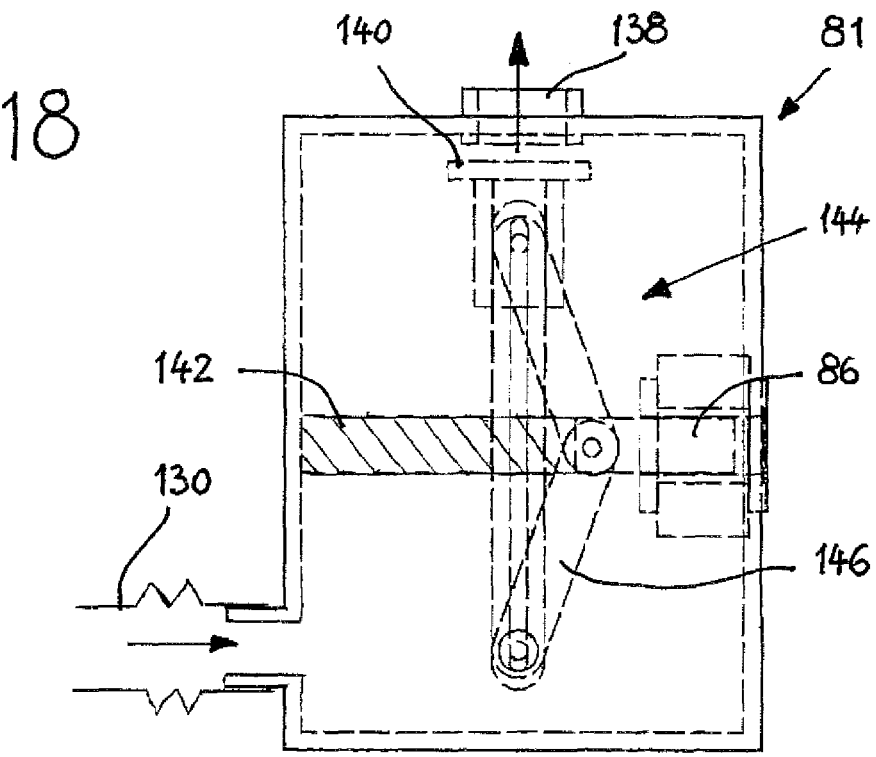
Figure 19:
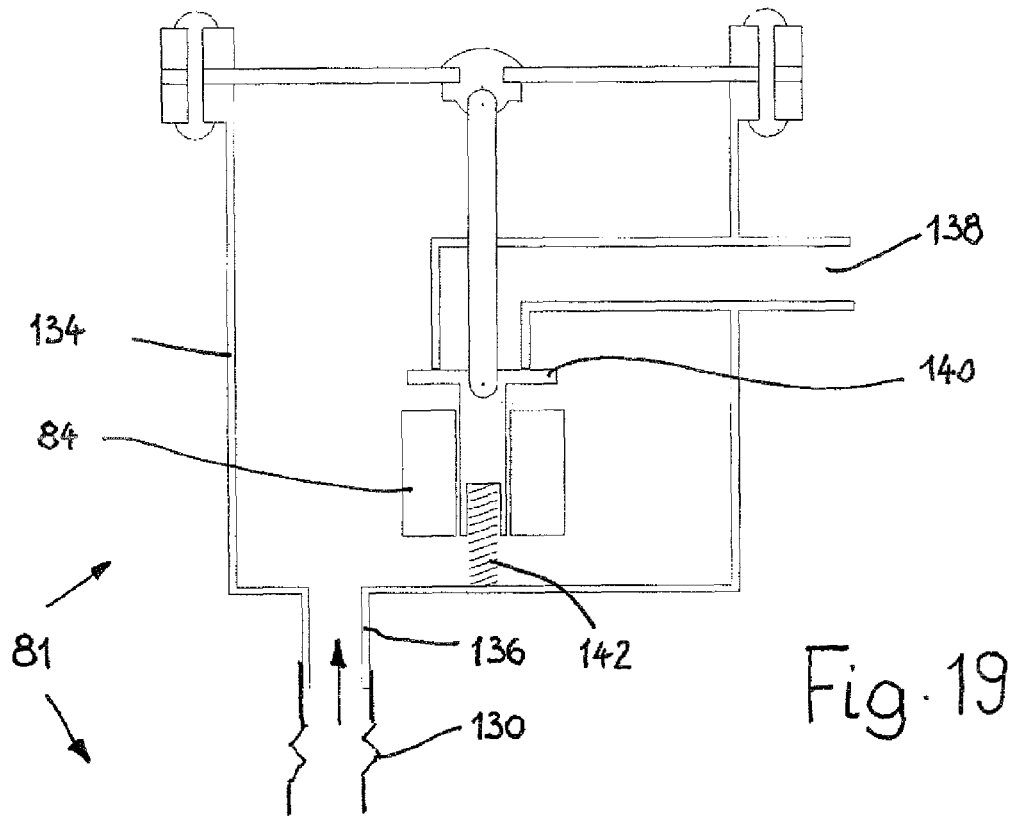
Figure 20:
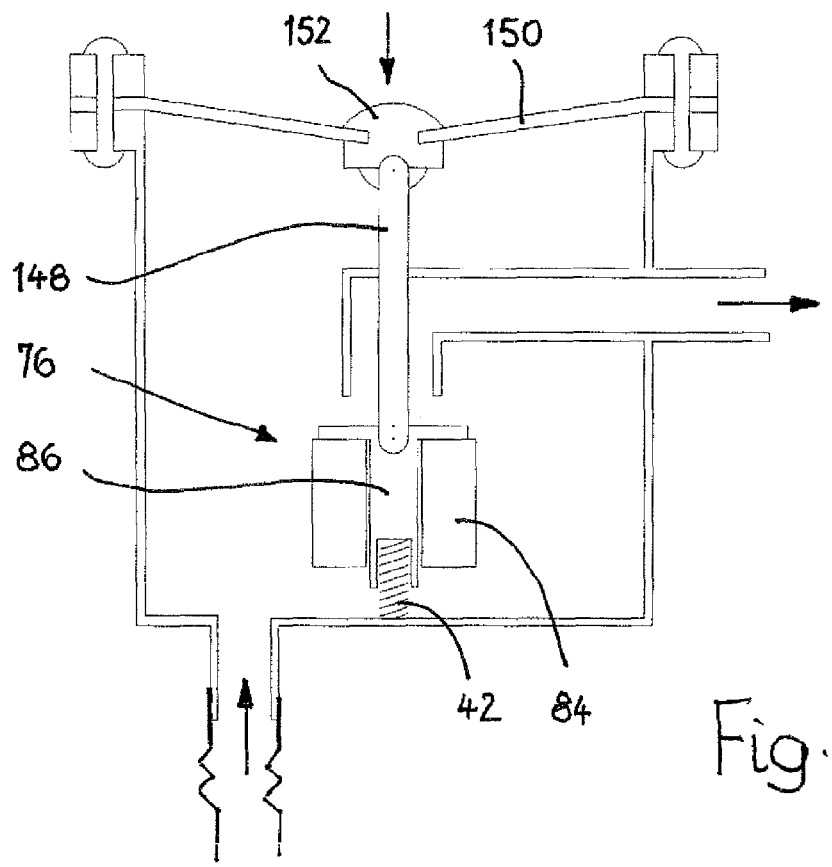

Further advantages and characteristic features of the invention will result from the claims and from the following description of preferred embodiments illustrated in the drawings in which:

FIG. 1 is a schematic view of a container provided with an inlet valve according to the invention, FIG. 2 shows the inlet valve in its closed position, FIG. 3 shows the inlet valve in its opened position, FIG. 4 is a schematic view similar to FIG. 1 of a container provided with a modified inlet valve, FIG. 5 shows the second embodiment of the inlet valve of FIG. 4 in its opened position, FIG. 6 shows said inlet valve in its closed position, FIG. 7 illustrates a modified embodiment of the valve of FIGS. 5 and 6 used as an outlet valve, FIG. 8 is a cross section of further embodiment of the inlet valve, FIG. 9 is the already discussed diagram showing the measuring accuracy of known volumetric meters, FIG. 10 is the above mentioned diagram referring to the flow characteristic of the roof tank ball valve, FIG. 11 illustrates a traditional inlet valve in its closed position, FIG. 12 shows the inlet valve of FIG. 11 in its opened position, FIG. 13 illustrates schematically an embodiment of a flushing system according to the invention, FIG. 14 shows a modified outlet valve of the system of FIG. 13 in its closed position, FIG. 15 shows the outlet valve of FIG. 14 in its opened position, FIG. 16 illustrates a further embodiment of an outlet valve according to the invention, FIG. 17 illustrates a release means in the form of an exhaust valve to be coupled with the outlet valve of FIG. 16, the exhaust valve being in its closed position, FIG. 18 illustrates the exhaust valve of FIG. 17 in its opened position, FIG. 19 shows a modified form of the exhaust valve in its closed position and FIG. 20 illustrates the exhaust valve of FIG. 19 in its opened position.

FIG. 1 illustrates schematically a liquid container 24, for example of a water toilet or a potable water tank. The inlet valve 10 used for filling the container 24 through an inlet tube 16 in the upper portion of the container 24 is shown in FIGS. 2 and 3. The container 24 is provided in its bottom portion 25 with an outlet tube 20 to be opened and closed by an outlet valve 30.

The inlet valve 10 has a valve housing 18 with an outlet orifice 16' to be opened and closed by a valve body 14 made up of a vertical spindle and a mushroom-like head. The desired water level A in the container 24 is controlled by a float 12 which is fastened through a lever 28 on a cam plate 32 having two actuating cams 34 between which a lever 36 of a toggle joint 26 is positioned.

In FIG. 3 the valve 10 is in its opened position due to the empty container 24. As soon as the liquid in the container 24 has reached the desired level A, the float 12 will be in the position of FIG. 2 and simultaneously the toggle joint 26 has switched instantaneously from the position of FIG. 3 into that of FIG. 2. This has the effect that the valve body 14 has immediately returned into its closed position shown in FIG. 2. Said return movement of the valve body 14 is assisted by the fluid flowing through the inlet tube 16 into the valve housing 18.

Thanks to the mentioned form of the bistabile inlet valve 10, this will be either in the OFF or in the ON position and will not allow trickle water flow, hence eliminating apparent water losses.

The same advantages are provided by the bistabile inlet valve 10 shown in FIGS. 4 to 6. Also in this case a float 12 is provided to control the liquid level A in the container 24.

As illustrated in FIGS. 5 and 6, the valve body of said inlet valve 10 is a flexible diaphragm 38 which is placed in the valve housing 18 such that this is subdivided in a lower chamber 40 and an upper chamber 42. The inlet tube 16 leads into the upper chamber 42 just in front of a first passage 44 provided in the diaphragm 38. A second passage 44' in the diaphragm 38 is positioned in front of the opening of an outlet orifice 16' leading the liquid into the container 24.

In the horizontal position of the diaphragm 38 of FIG. 5, both tubes 16 and 16' are interconnected such that liquid may flow into the container 24.

The diaphragm 38 is operated by an armature 46 slidably mounted in a guide tube 48 which is connected to the bottom of the lower chamber 40 of the valve housing 18. The guide tube 48 may have a circular or prismatic cross section, depending on the form of the armature 46.

The vertical movement of the armature 46 orthogonal to the plane of the diaphragm 38 is commanded by a ring shaped permanent magnet 50 fastened on the upper surface of the float 12. As soon as the float 12 has been raised to the upper level A of the liquid in the container 24, the armature 46 presses against the diaphragm 38 closing the passage 44' to the outlet orifice 16', whereas the passage 44 of the inlet tube 16 will remain open. In this position illustrated in FIG. 6 the diaphragm 38 has been deformed such that it closes the entrance port of the outlet tube 16'. Water flowing through the inlet tube 16 into the lower chamber 40 will press against the lower surface of the diaphragm 38 assisting in this way the closing effect.

When the outlet valve 30 is opened again, for example for a flushing operation, the level A will sink again such that the permanent magnet 50 fastened on the float 12 will open the valve as shown in FIG. 5.

In the embodiment of FIG. 7, the valve 10 illustrated in FIGS. 5 and 6 is used as an outlet valve 30 for the container 24. In the vertical position of the diaphragm 38 shown in FIG. 7 the inlet tube 16 is in connection with the outlet tube 16'. In order to instantaneously transfer the diaphragm 38 into its closing position, the armature 46 is commanded by an actuating element other than a float, e.g. of a mechanical, electrical, magnetic or electromagnetic type.

FIG. 8 illustrates a further embodiment of an inlet valve 10 according to the invention comprising a valve housing 18 to which the inlet tube 16 is connected. Also in this case the valve housing is subdivided by a diaphragm 38 into a lower chamber 40 and an upper chamber 42. The diaphragm 38 is stretched in the housing 18 and is provided with a balance passage 44 connecting the lower chamber 40 and the upper chamber 42.

The valve body 14 is a vertical spindle slidably mounted in an outlet tube 16' extending through the lower chamber 40. The upper end 52 of the spindle 14 is coupled to the diaphragm 38 whereas its lower end 54 is freely coupled to a fork end 56 of a lever 28. Said lever 28 carries on its other end the float 12 and is mounted in a pivot 58 close to the fork end 56 of the lever 28.

With the float 12 down in the empty position of the container, no pressure is exerted on the diaphragm 38. Water enters through the inlet tube 16 into the lower chamber 40 and lifts the spindle shaped valve body 14 through the diaphragm 38, allowing water to flow past the spindle 14 through the outlet 16' (see arrow in FIG. 8). Simultaneously the waters enters the upper chamber 42 through the balance orifice 44. When the water level is high enough to influence the flow 12, the up thrust from float 12 closes the spindle through its upper end 52 on to the diaphragm 38 which in turn closes on to its seating on the upper end of the outlet tube 16'. Due to the difference in area on the top and on the bottom of the diaphragm 38, this exerts a force down closing the diaphragm 38 more tightly on the seating.

If the float 12 moves again to the empty position it ceases to keep the seal on the spindle. This unbalances the situation, and the incoming water pressure opens the flow to the outlet 16'.

The advantages of the described valve embodiments according to the invention may be summarized as follows:

1. The valve is either in the on or in the off position and therefore will not allowe trickle water flow. This is the main advantage over the standard ball valve shown in FIGS. 11 and 12 since it will not cause apparent water losses.

2. The valve is much smaller in size hence the diameter or cross section of the container can be much smaller. Since the valve is much smaller, the tank can be of a decorative shape as it is not bound by the valve dimensions.

3. The valve uses much less plastic material and contains less moving parts.

4. The valve uses the pressure of the water to assist its closing and therefore will not give the leaking trouble that a standard ball valve gives especially with increased water pressure.

5. The valve does not require lubrication unlike the standard ball valve. The type of lubrication used is also a big concern with standard ball valves, especially if the reservoir is also used for drinking water.

6. The tank can be filled up to a higher level as the height of the valve is much smaller.

7. No electric supply is required to energise the valve which consequently does not consume energy.

FIG. 13 illustrates schematically a possible system according to the invention which may be used for example as a flushing system for the water tank 24 of a water toilet. Said tank or container 24 is closed by a removable lid 60. As already shown in FIGS. 1 and 4, the bottom 25 of the container 24 is provided with an entrance port 62 leading into the outlet tube 20 for the water. Said port 62 in the position of FIG. 13 is closed by the valve body 14 of the outlet valve 30, said valve body 14 having, at least in its lower part, a spherical or conical form adapted to hermetically close the circular seat 64 in the entrance port 62. In the embodiment of FIG. 13, the valve body 14 is a float ball. In the position of FIG. 13, the valve body 14 is resting on the circular seat 64 as in this position its weight is greater than its buoyancy.

The lateral wall 66 of the container 24 is provided with an overflow orifice 68 connected to an overflow pipe 70 which leads into the outlet tube 20. The overflow orifice 68 is on the level B of the desired maximum filling level in the container 24.

The valve body 14 is mounted vertically movable in a guide body 72 which is fastened on the bottom 25 of the container 24 and which is provided on its lower end 100 with discharge openings 102 for the liquid. The valve body 14 is connected to release means 81 for opening the entrance port 62 which will be described in the following.

Said release means 81 comprise a traction element 74, e.g. a flexible cord, connected to an actuating mechanism 76 provided on the lid 60 above the upper end of the container 24.

In order to initiate flushing, the actuating mechanism 76 is operated manually such that the traction cord 74 raises the valve body 14 from its circular seat 64. Water can now flow through the entrance port 62 into the outlet tube 20, and simultaneously the ball valve body 14 will rise further due to its buoyancy if its volume is such that the buoyancy is greater than its weight. As soon as the liquid level begins to sink, the ball valve body 14 will enter with a part of its volume into the circular seat 64 such that its buoyancy will be smaller than its weight whereby the entrance port 62 is closed.

The described basic construction may be improved by a float 80 in the form of a ball which is connected through the traction cord 74 with the valve body 14. The buoyancy of the float 80 exceeds its weight. When the water level in the container 24 is on the level A illustrated in FIG. 13, the valve body 14 will remain on its seat 64 closing the outlet tube 20. As soon as the liquid level rises, for example to the level A or B, the float 80 is pulling up, due to its buoyancy, the valve body 14 through the traction cord 74 such that water can flow through the entrance port 62 into the outlet tube 20 until the valve body 14 begins to close the port 62 due to its weight exceeding buoyancy. Accordingly, the outlet tube 20 is automatically opened without operating the actuating mechanism 76. Depending on the predetermined water inlet into the container 24—which will be explained in the following—the mentioned flushing phases will repeat in regular intervals which is very useful for public toilets.

According to a further improvement of the invention, the traction element 74 connects the actuating mechanism 76 with an electromagnetic lifter 82, comprising a solenoid coil 84 in which an armature 86 is vertically movable and acts as a plunger. The lower end of said plunger 86 is connected through the traction cord 74 with the valve body 14 as illustrated in the example of FIG. 13. This part of the traction element 74 may comprise also the already mentioned float 80.

The sliding armature 86 is a cylindrical body the lower portion 88 of which is made of magnetic material whereas its upper portion 90 is of non-magnetic material. The cylindrical body is provided on its upper and on its lower end with a flange 92 acting as limit stop against a solenoid coil 84.

The solenoid coil 84 is connected through a line 94 to a control circuit 96 which is connected in the illustrated embodiment with two release elements 98 and 98'. The release element 98' is positioned near the actuating mechanism 76 such that both may be alternatively activated.

According to the preferred embodiment, the release elements 98 and 98' may be provided with manually or foot actuated sensor pads.

If in this improved embodiment one of said release elements 98, 98' is actuated, the solenoid coil 84 will be energized by means of the control circuit 96 such that the armature 86 through its magnetic portion 88 will be lifted. By this lifting movement the valve body 14 is also lifted through the traction cord 74 opening the entrance port 62 to allow fluid flow into the outlet tube 20 until the valve body 14 will return to its rest position on the seat 64.

In the case of a breakdown of the public electric supply system, the solenoid coil 84 cannot be energized. In this case, flushing is possible by means of the mechanical actuating mechanism 76.

It is advantageous to provide also in this embodiment the float 80 because it reduces, thanks to its buoyancy, the pressure exerted by the water column on the valve body 14 such that the traction force of the magnetic lifter 82 to open the outlet tube 20 can be reduced; this is particularly advantageous in the case of very high containers 24.

The above mentioned control possibilities for flushing operations may be adopted alternatively or in combination:
 a) manual control of the actuating mechanism 76 and direct lifting of the valve body 14 through the traction cord 74,
 b) manual control as in a), assisted by the float 80,
 c) manual control as in a) or b) pulling also the plunger 86 in case of missing electric energy,
 d) lifting the valve body 14 (with or without float 80) by means of the electromagnetic lifter 82.

FIGS. 14 und 15 illustrate an improved embodiment of the outlet valve 30. Also in this case, the valve body 14 is vertically movable in a tube shaped guide body 72 the lower end 100 of which is fastened on the bottom 25 of the container 24 and is provided with discharge openings 102 for the liquid into the entrance port 62.

The main portion of the valve body 14 is a cylindrical body having a calotte shell lower end resting in the closed position on the circular seat 64. Alternatively, the lower end of the valve body 14 may be conical or cylindrical.

The guide body 72 is fastened within a cupular tube 104 having its open end positioned near the bottom 25 of the container 24. The upper end of said guide body 72 is fastened to a cover 106 of the cupular tube 104 and it is provided with overflow bores 110. The cover 106 comprises a central passage 108 for the traction element 74.

In FIG. 14 the outlet valve 30 is in its closed position, the container 24 being filled with liquid 78. By lifting the valve body 14 through the traction cord 74 and, if provided, by the lifter 82 shown in FIG. 13, the valve body 14 leaves its seat 64 such that the liquid may flow through the entrance port 62 into the outlet tube 20 (see arrows C in FIG. 15). Also in this case the valve body 14, thanks to its buoyancy, has the effect of a float. The flow C of the liquid exerts a suction effect in the annular chamber 112 between the guide body 72 and the cupular tube 104 which is shown by the arrows D. This has the effect of a low pressure in the annular chamber 112 and consequently of a partial vacuum E acting via the overflow and suction bores 110 on the upper surface of the valve body 14, thereby assisting the rising movement of the valve body 14. In this way the traction element 74 and the lifter 82 are relieved.

In order to command the water inlet, the following possibilities are described, one of which is illustrated in FIG. 13, showing that the inlet tube 16 provided with the inlet valve 10 and a flow control valve 114 leads into the upper zone of the container 24. In this embodiment, the inlet valve 10 may be a known solenoid valve connected through a control line 116 to a control circuit 118 which in turn is connected to two capacitive sensors 120a and 120b. Said sensors 120a and 120b are provided in different heights at the outer wall 66 of the container 24 and are used to control the filling level A and B respectively. The mode of operation of said capacitive sensors 120a and 120b is described in detail in German Patent Application DE-A 101 09 152 of the applicant.

When the liquid level in the container 24 has reached the desired height A or B the corresponding sensor 120a or 120b will close, through the control circuit 118, the inlet valve 10. The valve body 14 remains in its closed position shown in FIG. 13. After initiating a flushing operation through one of the release elements 98 or 98' or through the manual actuated mechanism 76, the liquid will fall to its minimum level that corresponds roughly to the radius of the ball shaped valve body 14. The sensors 120a, 120b and the control circuit 118 will again open the inlet valve 10 until the predetermined level A or B will be reached such that the inlet valve 10 will again be closed by means of the corresponding sensor 120a or 120b.

The control circuit 96 may be connected through a control line 122 to said control circuit 118 in order to provide for an intelligent control for two different filling levels A und B. To this end, the control circuit 96 is such that the lower sensor 120a allows only the lower filling level A. Actuating the release element 98', the electromagnetic lifter 82 will pull the valve body 14 into its opening position such that the smaller liquid quantity that corresponds to level A will be flushed. If alternatively the release element 98 is actuated, the container 24 will be filled to the higher level B were upon the upper sensor 120b closes the valve 10. Only now the solenoid coil 84 is activated such that the plunger 86 pulls the valve body 14 into its opening position.

In the embodiment of the outlet valve 30 shown in FIG. 16 the valve body 14 is a cylindrical body vertically movable in the guide body 72 closed by an upper lid 126. In the guide body 72 an upper air chamber 124 is provided between the valve body 72 and the upper lid 126. In said lid 126 an aperture 128 is provided which may be connected through a flexible air duct 130 to a release means 81 in form of a exhaust valve which may be of the embodiments of FIG. 17, 18 or 19, 20 respectively. The lower portion of the guide body 72 is provided with inclined discharge openings 102 leading into a ring-shaped lower pressure chamber 132.

While water is filling through the inlet tube 16 into the container 24 air is trapped above the float piston (valve body 14) in the air chamber 124 and in the flexible air duct 130 leading to the mentioned exhaust valve of FIG. 17, 18 or 19, 20. When the container 24 is filled, the water level B is reached in the container 24 while water level A is reached in the pressure chamber 132 of the guide body 72 underneath the valve body 14. The air chamber 124 is under pressure due to the height H of the water column B-A.

FIGS. 17 and 18 illustrate the opposite end of the flexible air duct 130 coupled to a connecting branch 136 of the release means 81. Said release means 81 is a housing 134 provided with said connecting branch 136 and with an air outlet 138 closed by a shutter 140 to be controlled by an actuating mechanism 76. In the example of FIGS. 17 and 18, said actuating mechanism 76 comprises a solenoid coil 84 having a sliding armature 86 with is coupled with said shutter 140. A spring 142 is provided to assist the closing movement of the armature 86.

Returning to FIG. 16 in connection with FIGS. 17 and 18, the housing 134 of the release means 81 is under the same high pressure as the air chamber 124. As soon as the solenoid coil 84 is energized, the shutter 140 coupled through the arms 146 of a toggle joint 144 with the sliding armature 86 will open the air outlet 138 and the compressed air is exhausted to atmosphere. The water level in the container 24 will rise to fill the air chamber 124 and will carry the piston valve body 14 to the upper part of the guide body 74. This will allow the water in the container 24 to flow through the entrance port 62 into the outlet tube 20.

FIGS. 19 and 20 illustrate a modified embodiment of the release means 81. Here the sliding armature 86 is an integral part of the shutter 140 and is coupled through a rod 148 to a diaphragm-lid 150 closing the housing 134. In its central part the diaphragm-lid 150 is provided with a push button element 152 connected to the rod 148.

The pressure of the air coming from the air chamber 124 through the air duct 130 into the housing 134 will exert a force which is proportional to the area of the diaphragm-lid 150. This force, together with the force of the spring 142, will assist the smaller force on the closing shutter which will prevent air from leaking through the air outlet 138. The flexibility of the diaphragm-lid 150 has also the added advantage that the shutter 140 can be operated manually through the rod 148 in the absence of an electrical supply, operating the push button element 152.

What is claimed is:

1. A system for opening and/or closing an inlet valve of a liquid container, particularly for water toilets or water tanks, comprising:
    an inlet tube in flow communication with the inlet valve disposed in an upper portion of the container; and
    an outlet tube in flow communication with an outlet valve disposed in a bottom portion of the container, the inlet and the outlet valves being each provided with a valve body,
    wherein the inlet valve is bistable by opening and closing lag-free without having the valve body of the inlet valve assume any intermediate opening and closing position, a closing stroke of the valve body of the inlet valve being assisted by a flow of the liquid, and
    wherein the valve body of the inlet valve comprises a diaphragm placed in a valve housing and dividing the valve housing into a first chamber and a second chamber, the diaphragm having two passages formed therein, one of the passages being an inlet passage in fluid communication with the inlet tube and the other passage being an outlet passage positioned to face the outlet tube and being configured to be disposed within an orifice of the outlet tube upon the diaphragm being urged against the outlet tube, the inlet and outlet tubes being coupled to said valve housing such to deliver and receive the fluid to and from the first chamber,
    wherein said diaphragm is operated by an armature slidably mounted in a guide tube coupled to the second chamber in front of the outlet passage of the diaphragm, the armature being configured to enable an abutting contact with said diaphragm, a sliding movement of said armature being orthogonal to a plane of the diaphragm, and
    wherein said armature is moved by a ring-shaped permanent magnet disposed around the guide tube and rigidly coupled to, and spaced from, an upper surface of a float.

* * * * *